Patented Mar. 16, 1948

UNITED STATES PATENT OFFICE 2,437,699

COPPER COMPLEXES OF DIANISIDINE DISAZO DYES

Joseph Francis Laucius, Wilmington, Del., and William W. Williams, Albany, N. Y., assignors to E. I. du Pont de Nemours & Company, Wilmington, Del., a corporation of Delaware No Drawing. Application January 11, 1944, Serial No. 517,894

6 Claims. (Cl. 260—148)

This invention relates to new dyestuffs which are substantive to cellulosic and to silk materials. In particular it relates to a class of coppered azo dyes made from azotized dianisidine coupled to a naphthol sulfonic acid.

In 1917 Gessler in U. S. P. 1,157,525 disclosed a number of pigments among which is a laked disazo compound resulting from the coupling of 2,6-naphthol-sulfonic acid and tetrazotized dianisidine, coppered with copper sulfate solution.

It is an object of this invention to prepare substantive dyes which are distinguished from the lakes of Gessler in being water-soluble textile dyestuffs. Other objects of the invention will be apparent or disclosed hereinafter.

The objects of the invention are accomplished, generally speaking, by coupling tetrazotized dianisidine to two moles of Schaeffer's salt, or certain other naphthol mono-sulfonic acids, and reacting the product with ammoniacal copper sulfate, or some other copper yielding compound, at a temperature high enough to split the methyl group off the dianisidine nucleus. In place of Schaeffer's salt, 1-naphthol-5-sulfonic acid or 1-naphthol-3-sulfonic acid may be employed as the coupling component, yielding respectively excellent blue and violet colors. The term Schaeffer's salt as used in this specification and claims refers to 2-naphthol-6-sulfonic acid.

In the practice of the invention the dyes are treated in substance with copper yielding agents, such as copper sulfate, copper acetate, and copper ammonium sulfate in aqueous solution, at temperatures which split off the methyl groups, for instance at temperature from 50°–150° C. Superatmospheric pressure may be employed but is not usually necessary.

The dyestuffs in the form of their alkali metal salts dye cotton, regenerated cellulose, and silk from dyebaths in strong violet to blue shades which show excellent fastness to light properties. When such dyeings are after-treated with crush proofing agents of the urea-formaldehyde condensation type, they maintain their excellent light fastness. The dyes also have very good exhaustion properties.

The dyestuff made from Schaeffer's salt is very weak before coppering but, after the coppering in substance, it is greatly strengthened and acquires improved characteristics. This is unexpected and contrary to prior art experience with dianisidine=>(naphthol mono-sulfonic acid)₂ colors. For instance, Color Index 502, dianisidine =>(1-naphthol-4-sulfonic acid)₂ is weaker after coppering than before, and the corresponding dyestuff from dianisidine=>(2-naphthol-7-sulfonic acid)₂ is still weak after coppering.

In the following example parts are expressed in parts by weight and the proportions employed are exemplary.

Example

To 4,000 parts water is added with stirring 244 parts dianisidine (3,3'-dimethoxy-4,4'-diaminodiphenyl), 183 parts 100% hydrochloric acid as a 22% solution and 138 parts sodium nitrite as a 30% aqueous solution with the temperature being maintained at 15–20° by addition of ice. The solution is stirred one-half hour and then added with stirring to a solution containing 518 parts sodium 2-naphthol-6-sulfonate, 72 parts sodium hydroxide, 180 parts sodium carbonate and 500 parts of ice. The reaction mixture is stirred an hour or more. A slight excess of 2-naphthol-6-sulfonic acid is present, due to a slight decomposition of the tetrazo compound. Alkalinity sufficient to give a strong spot test on Brilliant Yellow paper is maintained until the coupling is complete. The mixture is heated to 80–85°; 625 parts crystalline copper sulfate, 500 parts ammonia as a 28% solution, and 6000 parts of water are added. The heating is maintained for 16 hours and the pH is maintained at 9.0–9.5 by addition of ammonia. The charge is then salted 5%, filtered and the press cake dried. The dyestuff is represented in its acid form by the following formula:

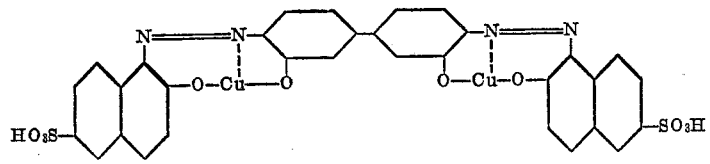

It is a dark powder, soluble in water, and dyes cellulosic and silk fibers by usual methods in a blue-violet shade very fast to light.

When 1-naphthol-5-sulfonic acid is substituted for 2-naphthol-6-sulfonic acid in the above, there results a dye which dyes cellulose textile material a blue shade very fast to light. Similarly, substitution of 1-naphthol-3-sulfonic acid for 2-naphthol-6-sulfonic acid leads to a dye which colors cellulosic textile material a strong violet shade fast to light.

The dyestuffs produced by this invention are much improved in quality over the nearest colors of the prior art, show astonishing strength following the coppering, and are not the compounds which were produced by Gessler.

As many apparently widely different embodiments of this invention may be made without departing from the spirit and scope thereof, it is to be understood that the invention is not limited to the specific embodiments thereof except as defined in the appended claims.

We claim:

1. A symmetrical water-soluble copper complex represented by the formula

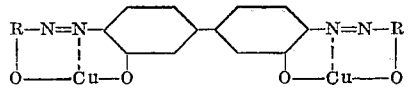

wherein R is the radical of one of the group consisting of 2-naphthol-6-sulfonic acid, 1-naphthol-3-sulfonic acid and 1-naphthol-5-sulfonic acid.

2. The water-soluble textile dyestuff represented in its acid form by the formula

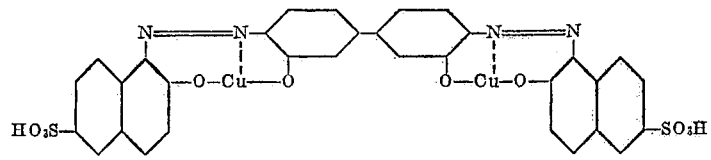

3. The water-soluble textile dyestuff represented in its acid form by the formula

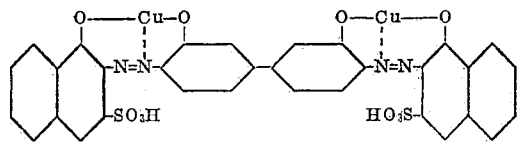

4. The water-soluble textile dyestuff represented in its acid form by the formula

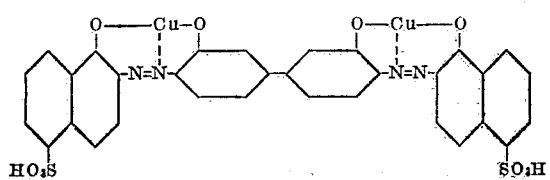

5. The process which comprises heating in ammoniacal medium with an agent yielding copper, the compound 3,3'-dimethoxy-4,4'-diamino-diphenyl=>(A)$_2$ which is coupled in alkaline medium and in which A is one of a group consisting of 2-naphthol-6-sulfonic acid, 1-naphthol-3-sulfonic acid and 1-naphthol-5-sulfonic acid, said heating being at a temperature which splits the methyl group from the dianisidine nucleus and forms a water-soluble copper complex having affinity for cellulosic fibers.

6. The process which comprises heating a disazo compound represented by the formula 3,3'-dimethoxy-4,4'-diamino-diphenyl=>(A)$_2$ in which A is one of a group consisting of 2-naphthol-6-sulfonic acid, 1-naphthol-3-sulfonic acid, and 1-naphthol-5-sulfonic acid with a soluble compound yielding copper, at a temperature which displaces the methyl groups from the diphenyl nucleus and forms a water-soluble copper complex having affinity for cellulosic textile fiber.

JOSEPH FRANCIS LAUCIUS.
WILLIAM W. WILLIAMS.

REFERENCES CITED

The following references are of record in the file of this patent:

UNITED STATES PATENTS

| Number | Name | Date |
|---|---|---|
| 1,921,337 | Wiedemann et al. | Aug. 8, 1933 |
| 1,157,525 | Gessler | Oct. 19, 1915 |
| 1,957,580 | Delfs et al. | May 8, 1934 |
| 2,294,426 | Scully | Sept. 1, 1942 |

FOREIGN PATENTS

| Number | Country | Date |
|---|---|---|
| 166,220 | Switzerland | Mar. 1, 1934 |